United States Patent [19]
Preis et al.

[11] Patent Number: 5,942,883
[45] Date of Patent: Aug. 24, 1999

[54] CIRCUIT FOR SUPPLYING CURRENT

[75] Inventors: Karl-Heinrich Preis, Buehlertal; Robert Kern, Sasbachwalden; Joerg Sutter, Gaggenau, all of Germany

[73] Assignee: Robert Bosch GmbH, Stuttgart, Germany

[21] Appl. No.: 08/860,424

[22] PCT Filed: Nov. 21, 1995

[86] PCT No.: PCT/DE95/01618

§ 371 Date: Jun. 24, 1997

§ 102(e) Date: Jun. 24, 1997

[87] PCT Pub. No.: WO96/20527

PCT Pub. Date: Jul. 4, 1996

[30] Foreign Application Priority Data

Dec. 24, 1994 [DE] Germany .............................. 44 46 532

[51] Int. Cl.[6] .............................. G05F 1/613; G05F 1/40; G05B 24/02
[52] U.S. Cl. .............................. 323/282; 323/224; 323/351
[58] Field of Search .............................. 323/222, 224, 323/282, 351; 315/307

[56] References Cited

U.S. PATENT DOCUMENTS

| 4,904,907 | 2/1990 | Allison et al. .......................... 315/307 |
| 5,412,308 | 5/1995 | Brown ...................................... 323/222 |
| 5,519,306 | 5/1996 | Itoh et al. ............................... 323/222 |
| 5,633,579 | 5/1997 | Kim ........................................ 323/222 |

FOREIGN PATENT DOCUMENTS 0 580 198 A 2   1/1994   European Pat. Off. ....... H02M 3/156

OTHER PUBLICATIONS

J. Beckmann: "Getaktete Stromversorgung" [Clocked Current Supply]. Franzis–Verlag, 1990, pp. 9–34.

IEEE Power Electronics Specialists Conference in Palo Alto, California, Jun. 14–16, 1977.

*Primary Examiner*—Peter S. Wong
*Assistant Examiner*—Bao Q. Vu
*Attorney, Agent, or Firm*—Venable; Norman N. Kunitz

[57] ABSTRACT

A power-supply circuit having a switching regulator (10) and at least one additional circuit (14, 14') whose two respective outputs (11, 17) are guided together to a common or joint output (18) by diodes (D3, D3'; D4). The additional circuit (14, 14') produces, from an alternating quantity (15) occurring inside the switching regulator (10), a second output voltage (U+, U'+) that is in a second output-voltage range and is more positive with respect to the first output voltage (U−) that is made available at the first output (11) of the switching regulator (10) and is in a first output-voltage range. A gas-discharge lamp, for example, is provided as the load (L) between the first and second outputs. The division of the voltage ranges to be made available for the load (L) into at least two partial ranges permits a high effectiveness of the current-supply circuit of the invention.

22 Claims, 1 Drawing Sheet

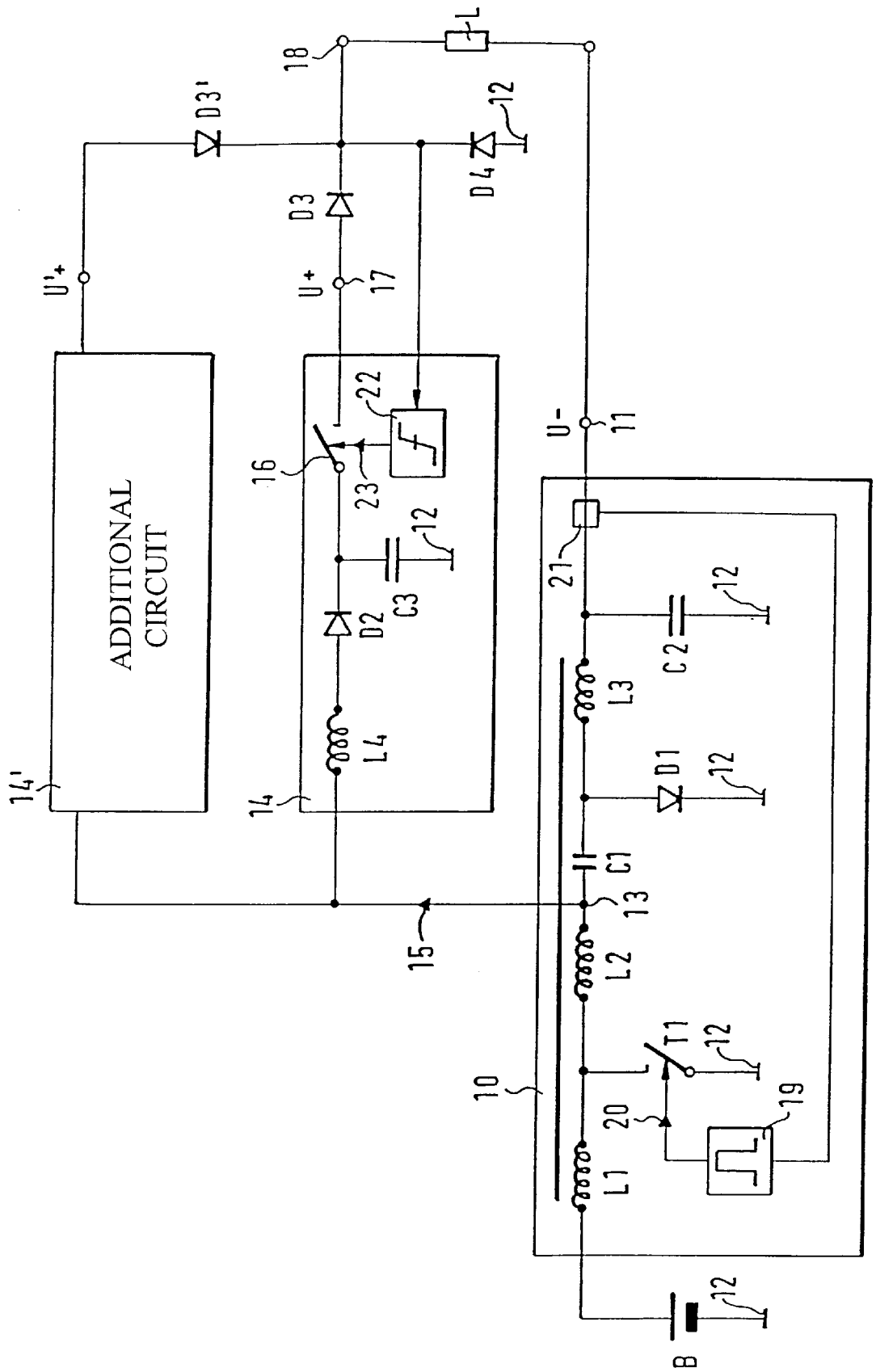

CIRCUIT FOR SUPPLYING CURRENT

BACKGROUND OF THE INVENTION

The invention relates to a current-supply circuit for feeding an electrical consumer or load, with, the circuit having a switching regulator that is known from background literature. Corresponding circuits are known, for example, from the technical reference book by J. Beckmann, "Getaktete Stromversorgung [Clocked Current Supply]," Franzis-Verlag, 1990, pp. 9–34. The switching regulator includes at least one semiconductor power component that is switched completely on or off with a switching signal produced by an actuation circuit. An energy source produces energy with a predetermined output voltage or a predetermined output current through cooperation with inductive and capacitive components. The aforementioned background literature describes current-supply circuits that convert a predetermined input DC voltage into either a smaller or a larger output DC voltage. A DC voltage converter that corresponds to a combination up-down converter is known from the proceedings of the IEEE Power Electronics Specialists Conference in Palo Alto, Calif., Jun. 14–16, 1977. In the known current-supply circuit, the positive terminal of an input DC voltage source is coupled to a first coil. The first coil is connected to a first capacitor. A semiconductor power component alternatingly switches the connecting point between the first coil and the first capacitor, and the connecting point between the first capacitor and a second coil, to a common point between the input DC voltage source and a load. The second coil is in series with the load. A second capacitor is switched in parallel to the load for smoothing. The semiconductor power component can be realized by a transistor connected to the first coil and a diode connected to the second coil, with both the transistor and the diode being switched to the common point between the input DC voltage source and the load.

The output voltage or output current to be predetermined can be varied within specific limits through a corresponding actuation of the at least one semiconductor power component. A large predetermined range is accompanied by the disadvantage that the effectiveness of the current-supply circuit drops in partial ranges. Moreover, the increase in the generation of electromagnetic disturbing radiation, at least in partial ranges, must be taken into account.

SUMMARY AND ADVANTAGES OF THE INVENTION

The current-supply circuit of the invention has the advantage that the voltage or current made available to a load connected to an output of the current-supply circuit can have a wide range.

According to the invention, of a first output, a switching regulator produces an output voltage, which is in a first voltage range, through a switching operation of at least one semiconductor power element. At a second output, an additional circuit produces an output voltage, which is in a second voltage range, from an alternating quantity occurring inside the switching regulator. The second voltage range is higher than the first output voltage range. The two outputs are guided by way of decoupling diodes to a common output, to which the load is connected.

The establishment of two different output currents can be provided instead of the establishment of the two output voltages, with the internal resistance of the load establishing the voltage. The establishment of either the voltages or the currents includes the case that a smaller current is available at the output at which the higher voltage is present.

The essential advantage of the current-supply circuit of the invention lies in the simple embodiment possible with multiplexing of electrical components that are present anyway in the switching regulator having the first output. The coupling out of an alternating quantity for the additional circuit is possible in all converter types. At least the semiconductor power component of the switching regulator can be omitted in the additional circuit. The current-supply circuit of the invention permits the configuration of the switching regulator as, for example, a flow-through converter, while the additional circuit is configured as a blocking-oscillator converter.

With its various configuration options, the current-supply circuit of the invention can be adapted to the requirements stipulated by the different output voltage or current ranges and with respect to the available energy.

Advantageous refinements and modifications of the current-supply circuit are disclaimed and disclosed in the application and basic recited in the claims.

The alternating quantity for the additional circuit, which is derived inside the switching regulator, is preferably tapped at an inductive component of the switching regulator. Higher voltage jumps may occur at an inductive component, for example at the semiconductor power component. Therefore, with a suitable circuit design, an additional throttle for limiting the current delivered into the additional circuit can be omitted.

An advantageous modification provides a switch-off option for the additional circuit. The circuit can be switched off if the increased voltage is no longer required to supply a connected consumer. The switch-off increases the effectiveness of the current-supply circuit through the elimination of losses in the additional circuit.

An embodiment of this modification provides the switch-off of the additional circuit as a function of the voltage present at the common output. The output voltage is compared to a predetermined threshold value in a comparator. If the threshold value is exceeded, a switch-off signal opens an electromechanical or semiconductor switch. A transistor whose switching path is switched in series with the second output of the current-supply circuit of the invention is preferably provided for switching off the additional circuit.

The current-supply circuit of the invention is particularly well-suited for the energy supply of electrical loads having a variable internal resistance. An example of a load of this type is a gas-discharge lamp in which the connection between the applied voltage and the lamp current is nonlinear. Different voltages are required to ignite and operate gas-discharge lamps. A high-voltage pulse that can be up to several Kilovolts, depending on the filling pressure of the lamp, is required to ignite the gas-discharge lamp. Shortly after ignition, the gas-discharge lamp requires a takeover voltage higher than the subsequent arc voltage. In the transition phase, the lamp plasma is built up, starting from an ignition-spark channel. The transfer voltage can be a factor of 10 above the arc voltage. The current-supply circuit of the invention is particularly well-suited for producing both the takeover voltage and the arc voltage. The voltage supplied by the additional circuit corresponds to the takeover voltage, and the voltage produced by the switching regulator corresponds to the subsequent arc voltage. The higher second voltage made available by the additional circuit can be provided for energy supply of a separate ignition circuit. The advantage of the higher voltage level is that the transmission ratio to be provided in the ignition circuit can ultimately be lower.

In a downstream current rectifier, the DC voltage produced by the current-supply circuit of the invention is preferably converted into an AC voltage that is better suited than a DC voltage for operating a gas-discharge lamp.

Further advantageous modifications and embodiments of the current-supply circuit of the invention ensue from further, dependent claims and the following description.

BRIEF DESCRIPTION OF THE DRAWING

The FIGURE shows a circuit diagram of a current-supply circuit of the invention.

DETAILED DESCRIPTION OF PREFERRED EMBODIMENTS

A switching regulator 10 shown in the figure produces a first output voltage U− at a first output 11. The energy is produced by an energy source B. The voltages of the current-supply circuit of the invention are with respect to a ground 12.

The energy source B connected to ground 12 is connected to a first coil L1. The other connection of the first coil L1 can be connected to ground 12 by way of a first transistor T1. By way of a second coil L2, both the first coil L1 and the first transistor T1 are connected at a connecting point 13, to which a first capacitor C1 is guided. The first and second coils L1, L2 are coupled in the manner of a transformer. The other end of the first capacitor C1 is connected, on the one hand, to ground 12 by way of a first diode D1 and, on the other hand, to the first output 11 by way of a third coil L3. A second capacitor C2 is connected between the first output 11 and ground 12.

A fourth coil L4 included in an additional circuit 14 is connected at the connecting point 13 of the switching regulator 10. An alternating quantity 15 occurring at the connecting point 13 inside the switching regulator 10 can therefore be supplied to the additional circuit 14. The alternating quantity 15 travels by way of the fourth coil L4, a second diode D2 and a second transistor 16 to a second output 17, which corresponds to the output of the additional circuit 14. A third capacitor C3 connected to ground 12 is connected at the connection between the second diode D2 and the second transistor 16. A second output voltage U+ is present at the second output 17.

The first output 11 and the second output 17 are present at a common output 18, to which a load L is connected. The two outputs 11, 17 are decoupled from one another by means of a third and a fourth diode D3, D4. The third diode D3 connects the second output 17 to the common output 18. The fourth diode D4 is connected from the common output 18 to ground 12. The load L is between the common output 18 and the first output 11.

A control circuit 19 that produces a first control signal 20 as a function of the current flowing into the first output 11 is provided for switching the first transistor T1 included in the switching regulator 10. The current is detected by a current sensor 21.

A comparator 22 that emits a second control signal 23 is provided for actuating the switching transistor 16 included in the additional circuit 14. The comparator 22 compares the voltage present at the common output 18 to a predetermined threshold value.

The alternating quantity 15 can be supplied to further additional circuits 14' that produce corresponding output voltages U'+ and couple them to the common output 18 by way of further diodes D3'.

The current-supply circuit of the invention operates as follows:

At the first output 11, the switching regulator 10 produces the first output voltage U−, which, in the illustrated embodiment, is negative in comparison to the voltage of the energy source B with respect to ground 12. It is assumed that the first transistor T1 is initially closed. The first coil L1 is thus connected to the energy source B. A current begins to flow in the first coil L1, which stores a corresponding magnetic energy. After the first transistor T1 is opened, the current previously flowing through the first transistor commutates to the second coil L2, and charges the first capacitor C1 by way of the conductive first diode D1.

After the first transistor T1 has been closed, the first coil L1 is again connected to the input voltage, while the first capacitor C1 is connected to a negative voltage by way of the second coil L2 and the first transistor T1, the voltage being dependent on the transmission ratio between the first and second coils L1, L2, which form a transformer. Now a negative voltage is present at the first diode D1, so that it is blocked. The second capacitor C2 is connected to this negative voltage by way of the third coil L3. The voltage induced in the third coil L3 is a function of the transmission ratio between the first coil L1 and the third coil L3, which form a (partial) transformer. The first output voltage U− arising at the first output 11 has a predeterminable value that is detected by a sensor, not shown in the Figure, and can be supplied to the control circuit 19. The control circuit 19 switches the first transistor T1 with the first control signal 20 such that, for example, the first output voltage is regulated at the predetermined value. Instead of the regulation of the first output voltage U− at a predetermined value, a current regulation can also be provided, in which instance the first output voltage U− is in a first predeterminable voltage range, while the output current made available at the first output 11 is regulated at a predetermined value. In the Figure, the current regulation is assumed by way of example, with the current that flows through the first output 11 being detected by the current sensor 21. The current sensor 21 is, for example, a series resistor having a low ohmic resistance, or, for example, an element that is sensitive to magnetic fields and detects the magnetic field surrounding a conductor flowed through by current.

Further, detailed accounts of the function of the switching regulator 10 are included in the related art mentioned at the outset, namely the conference proceedings, which will be referred to expressly in the discussion.

In accordance with the invention, at least one additional circuit 14, 14' is provided; at the second output 17, this circuit makes available a second output voltage U+, U'+ from the alternating quantity 15 occurring inside the switching regulator 10. The alternating quantity 15 is tapped at the connecting point 13, which lies between the second coil L2 and the first capacitor C1. Voltage jumps that can be from positive to negative voltages, with respect to ground 12, occur at the connecting point 13. The alternating quantity 15, which, in the illustrated embodiment, is an at least approximately square-wave voltage, leads to a current flux in the fourth coil L4 of the additional circuit 14, provided that the second diode D2 of the additional circuit 14 is charged with a polarity with which it is conductive. The components of the additional circuit 14, that is, the coil L4, the second diode D2 and the third capacitor C3, together form a blocking-oscillator converter structure whose function is explained in detail in the related art mentioned at the outset, namely the technical reference book by J. Beckmann. A characteristic of the blocking-oscillator converter is the discontinuous transmission of energy to the second output 17, with intermediate storage being provided in the third capacitor C3 for maintaining the second output voltage U+, U'+.

In the illustrated embodiment, the additional circuit 14, 14' includes no further measures for regulating the second output voltage U+, U'+. The regulation is exclusively effected by way of the first transistor T1 of the switching regulator 10. The additional circuit 14 can also include a corresponding voltage stabilization. Instead of the establishment of the second output voltage U+, U'+, which is assumed in the embodiment, an establishment of the current flowing through the second output 17 can also be provided corresponding to the configuration of the switching regulator 10.

An essential feature of the invention is that the first and second outputs 11, 17 are guided together by way of the third, fourth, and further diodes D3, D3', D4 to the common output 18. In the illustrated embodiment, the load L is between the first output 11 and the common output 18. This arrangement of the load L is possible with the assumptions that the first output voltage U− present at the first output is negative with respect to ground 12, that the second output voltage U+, U'+ present at the second output 17 is positive with respect to ground 12, that the anode connection of the third diode D3, D3' is at the second output 17 and the cathode connection is at the common output 18, and that the anode connection of the fourth diode D4 is at ground 12 and the cathode connection is at the common output 18. With these prerequisites, the second output voltage U+ must not be larger in amount than the first output voltage U−. Solely with regard to ground 12, the second output voltage U+, U'+ is larger than the first output voltage U− according to operational sign.

Instead of the establishment of the two output voltages U+, U'+; U' and the guiding together by way of diodes D3, D3'; D4 to a common output 18, as shown in the embodiment, an arrangement can be provided in which the anode connections of the diodes D3, D3', D4 are respectively connected to the outputs 11, 17 and the cathodes of the diodes D3, D3', D4 lead to the common output 18.

In any event, either the switching regulator 10 or the additional circuit 14 is switched to the load L, depending on which output voltage U+, U'+, U− is higher with respect to ground 12. If the poles of the diodes D3, D3', D4 are reversed, the ratios are respectively reversed.

An advantageous modification provides the use of the second transistor 16, which is actuated by the second control signal 23 emitted by the comparator 22. The comparator 22 compares the voltage occurring at the common output 18 to a fixed, predetermined threshold value. The purpose of this measure is to switch the additional circuit 14 on or off as a function of the voltage present at the common output 18. A switch-off increases the effectiveness of the entire arrangement comprising the switching regulator 10 and the additional circuit 14, because the withdrawal of energy from the switching regulator 10 by way of the alternating quantity 15 with a switched-off additional circuit 14 is omitted.

The circuit arrangement of the invention is particularly provided for supplying a load L with energy having a variable voltage-supply range. An example of such a load L is a gas-discharge lamp. Following the ignition of this type of lamp, the transition to a stable burning operation must first be achieved. In this transition phase, which immediately follows the ignition process, an increased voltage with a comparatively low current is required. The production of the increased voltage with a low current can be taken over by the additional circuit 14, 14'. The second output voltage U+, U'+ is therefore established at a value that is sufficient for the task at hand. The current that is lower in comparison to the burning operation of the lamp permits the configuration of the additional circuit 14 as a blocking-oscillator converter. During this phase, the switching regulator 10 does not initially need to make any energy available at the first output 11. In the illustrated embodiment, in which the load L is connected directly to the first output 11, the current provided by the additional circuit 14, 14' likewise flows through the first output 11. The first output voltage U− is therefore added directly to the second output voltage U+, U'+ in this embodiment; provided that the current flowing through the load L can no longer be applied, the energy supply of the load L commutates completely to the switching regulator 10. In the described embodiment with the gas-discharge lamp as the load L, this means that the first output voltage U− forms the arc voltage of the lamp, with the lamp-operating current being made available exclusively by the switching regulator 10 by way of the first output 11, the current flowing to ground 12 via the lamp and the fourth diode D4. In this operating state of the lamp, the voltage at the common output 18 is dropped from initially positive values, with respect to ground 12, to a low, negative value that is dependent on the on-state voltage of the fourth diode D4. The comparator 22 that compares the output voltage at the common output 18 to a fixed, predetermined threshold value determines whether the voltage at the common output 18 is lower than a predetermined limit value. Once the stable burning operation of the lamp has been achieved, the second transistor 16 is opened and the additional circuit 14 is thus switched off.

With respect to the gas-discharge lamp proposed as the load L, the advantage of the establishment of the voltage in the embodiment is that the gas-discharge lamp is essentially operated with a negative potential with regard to ground 12, the potential preventing a damaging ion migration into the lamp body in the gas-discharge lamp. An operation of the gas-discharge lamp as the load L with the DC voltage assumed in the embodiment would generally lead to rapid wear of the electrodes. Therefore, a current rectifier which, with respect to the lamp electrodes, generates an AC voltage, is preferably provided at the common output 18. A metal-doped, high-pressure gas-discharge lamp, for example, that is particularly well-suited for use as a headlight lamp in a motor vehicle can preferably be provided as the load L. The arc voltage of this type of lamp, which is produced by the switching regulator 10 as a first output voltage U−, is approximately 100 Volts. The flowing current of approximately 350 mA establishes the preferred level at which the lamp power is regulated. The current is readjusted until the predetermined lamp power is achieved. The second output voltage U+, U'+ produced by the additional circuit 14, 14' and required immediately following ignition of the lamp is, for example, 500 to 1000 Volts, while the current is merely a few tens of mA. In this embodiment, with the gas-discharge lamp as the load L, no regulation of the current or the voltage at the second output 17 of the additional circuit 14, 14' is necessary.

The use of a plurality of additional circuits 14, 14', which respectively produce an output voltage U+, U'+ in different ranges, permits a further division of the voltage required for the load L in association with a further increase in effectiveness. The further additional circuits 14' are realized corresponding to the additional circuit 14, for example.

We claim:

1. Current-supply circuit for producing a DC voltage or a DC current, having; a switching regulator (10) that produces a first output voltage (U−) at a first output (11), with the first output voltage being in a first range, through a switching operation of at least one switching element (T1) in the regulator: at least one additional circuit (14, 14') that produces, from an alternating quantity (15) occurring at a connecting point (13) inside the switching regulator (10), a second output voltage (U+, U'+) at a second output (17), the second output voltage being in a second range; and decoupling diodes (D3, D3', D4) that guide the first and second voltage outputs (11, 17) together to a common output (18).

2. Current-supply circuit according to claim 1, wherein at least one coil (L2) is connected at the connecting point (13) in the switching regulator (10).

3. Current-supply circuit according to claim 1, wherein the switching regulator (10) operates as a flow-through converter, and the additional circuit (14) operates as a blocking-oscillator converter.

4. Current-supply circuit according to claim 1, wherein circuit means are provided to switch off the additional circuit (14).

5. Current-supply circuit according to claim 4, wherein the circuit means switching off the additional circuit (14) as a function of the voltage present at the common output (18), and includes a comparator (22) for comparing the voltage at the common output to a predetermined threshold value.

6. Current-supply circuit according to claim 1, characterized in that a load (L) to be supplied with energy is connected to the first output (11) of the switching regulator (10) and to the common output (18).

7. Current-supply circuit according to claim 1, wherein the output current made available at the first output (11) of the switching regulator (10) is regulated at a predetermined value.

8. Current-supply circuit according to claim 1, wherein the second output voltage (U+, U'+) present at the second output (17) of the additional circuit (14, 14') has a more positive value than the first output voltage (U−) occurring at the first output (11) of the switching regulator (10).

9. Current-supply circuit according to claim 1, wherein a gas-discharge lamp is provided as a load (L) to be supplied with energy.

10. Current-supply circuit according to claim 9, wherein the gas-discharge lamp is a metal-doped, high-pressure gas-discharge lamp.

11. A power-supply circuit for producing a DC voltage or a DC current, comprising: a switching regulator (10), which through a switching operation of at least one switching element (T1) in the switching regulator, produces a negative output voltage (U−), relative to ground, at a first output (11); at least one additional circuit (14, 14') having an input which is coupled to a connecting point within the switching regulator at which an alternating variable occurs, and which produces a second positive output voltage (U+, U'+), relative to ground, from the alternating quantity (15) occurring at the connecting point (13) within the switching regulator (10) at a second output (17); and, decoupling diodes (D3, D3', D4) that bring together the first and second outputs (11, 17) at a joint output (18) for the energy supply of a load (L) connected between the first output (11) and the joint output (18).

12. A power-supply circuit according to claim 11, wherein at least one coil (L2) is connected to the connecting point (13) within the switching regulator (10).

13. A power-supply circuit according to claim 11, wherein the switching regulator (10) is a flow-through DC/DC converter, and the additional circuit (14) is a blocking-oscillator converter.

14. A power-supply circuit according to claim 11, wherein the additional circuit includes circuit means for selectively switching off the additional circuit (14).

15. A power-supply circuit according to claim 14, wherein the circuit means for selectively switching off the additional circuit (14) includes a further switching element (16) connecting the positive output voltage of the additional circuit to the second output, and a comparator (22) which compares the voltage present at the common output (18) to a predetermined threshold value and which controls the position of the further switch when the threshold value is reached.

16. A power-supply circuit according to claim 11, wherein the switching regulator regulates the output current available at the first output (11) of the switching regulator (10) to a predetermined value.

17. A power-supply circuit according to claim 11, wherein the joint load to be supplied with energy is a gas-discharge lamp.

18. A power-supply circuit according to claim 17, wherein the gas-discharge lamp is a metal-doped, high-pressure gas-discharge lamp.

19. A power-supply circuit according to claim 11, wherein the switching regulator includes: first, second and third mutually coupled coils connected in a series circuit between an input for a DC energy source and the first output, with a first capacitor connected in the series circuit between the first and second coils, with the connection point of the second coil and the first capacitor being the connecting point for the input of the additional circuit, and with the at least one switching element being connected between the connecting point of the first and second coils and ground; a first diode connecting the junction of the first and second coils to ground; a second capacitor connecting the junction of the third coil and the first output to ground; a sensor which detects one of the current and the voltage at the first output and provides a corresponding output signal; and a controller, which is responsive to the output signal of the sensor, and which controls the switching of the at least one switching element to regulate one of the output current and voltage at the first output to a predetermined value.

20. A power-supply circuit according to claim 19 wherein the additional circuit comprising a fourth coil having one of its ends connected as the input of the additional circuit to the connecting point within the switching regulator, and its opposite end connected in series with a second diode to the second output; and a third capacitor connecting the connection of the second diode to the second output to ground.

21. A power supply circuit according to claim 20, further comprising at least one further of the additional circuits, each having a respective input coupled to the connecting point within the switching regulator, and each producing a different positive output voltage at a respective different further output; and a respective decoupling diode connecting each of the further outputs to the common output.

22. A power supply circuit according to claim 11, further comprising at least one further of the additional circuits, each having a respective input coupled to the connecting point within the switching regulator, and each producing a different positive output voltage at a respective different further output; and a respective decoupling diode connecting each of the further outputs to the common output.

* * * * *